United States Patent
Martínez et al.

(10) Patent No.: US 8,506,226 B2
(45) Date of Patent: Aug. 13, 2013

(54) SECURITY SCREW

(76) Inventors: Jordi Matarrodona Martínez, Barcelona (ES); Antonio Bullich Traveset, Barcelona (ES)

(*) Notice: Subject to any disclaimer, the term of this patent is extended or adjusted under 35 U.S.C. 154(b) by 544 days.

(21) Appl. No.: 12/602,064

(22) PCT Filed: May 9, 2008

(86) PCT No.: PCT/ES2008/000335
§ 371 (c)(1),
(2), (4) Date: Nov. 25, 2009

(87) PCT Pub. No.: WO2008/145779
PCT Pub. Date: Dec. 4, 2008

(65) Prior Publication Data
US 2010/0209212 A1 Aug. 19, 2010

(30) Foreign Application Priority Data
May 25, 2007 (ES) .................................. 200701541

(51) Int. Cl.
*F16B 35/02* (2006.01)
(52) U.S. Cl.
USPC ............ 411/385; 411/383; 411/411; 411/424
(58) Field of Classification Search
USPC .............. 411/264, 366.3, 383, 385, 411, 418, 411/424, 929
See application file for complete search history.

(56) References Cited

U.S. PATENT DOCUMENTS

| | | | |
|---|---|---|---|
| 514,570 A | | 2/1894 | Stancliff |
| 537,244 A | * | 4/1895 | Stancliff ..................... 411/264 |
| 577,521 A | * | 2/1897 | Stancliff ..................... 411/264 |
| 764,591 A | | 7/1904 | Hughes |
| 915,217 A | * | 3/1909 | Ravilly ....................... 411/263 |
| 1,075,980 A | * | 10/1913 | Kling .......................... 411/385 |
| 1,111,657 A | * | 9/1914 | Kohler ........................ 411/385 |
| 1,135,515 A | * | 4/1915 | Frauenheim ............... 411/385 |
| 1,367,763 A | * | 2/1921 | Fitzsimmons et al. ...... 411/385 |
| 1,581,333 A | * | 4/1926 | Childs ........................ 411/264 |
| 1,581,531 A | * | 4/1926 | Childs et al. .............. 411/264 |

(Continued)

FOREIGN PATENT DOCUMENTS

| | | |
|---|---|---|
| DE | 3035119 | 4/1982 |
| DE | 3742070 | 7/1988 |

(Continued)

*Primary Examiner* — Roberta Delisle
(74) *Attorney, Agent, or Firm* — Egbert Law Offices, PLLC

(57) ABSTRACT

A security screw formed by a cylinder part divided in two parts in the threaded area with a division line in a partial way of the axial axle or very close to it. In one of these parts a cylinder area has been removed, coaxial (max. eccentricity: 1% of the radius of the thread), with the result that both parts can be moved between themselves, with the thread lined up or not lined up depending on the function of the angle position. Depending on the removed area position, the nut can be threaded or unscrewed. In addition, the nut can be unblocked by immobilizing these parts in the corresponding angle position according to the lining up of the threads.

2 Claims, 3 Drawing Sheets

(56) References Cited

U.S. PATENT DOCUMENTS

| | | | | |
|---|---|---|---|---|
| 2,352,297 A | * | 6/1944 | Wales | 411/368 |
| 2,517,361 A | * | 8/1950 | Staats | 294/82.25 |
| 2,936,625 A | * | 5/1960 | Heiseler | 74/1 R |
| 3,298,273 A | * | 1/1967 | McKelvey | 411/1 |
| 3,339,952 A | * | 9/1967 | Beckman | 403/282 |
| 4,309,140 A | | 1/1982 | Steffen et al. | |
| 6,186,716 B1 | * | 2/2001 | West et al. | 411/30 |
| 6,354,779 B1 | * | 3/2002 | West et al. | 411/80.1 |
| 2003/0143058 A1 | * | 7/2003 | Takahashi et al. | 411/387.4 |

FOREIGN PATENT DOCUMENTS

| | | |
|---|---|---|
| DE | 20308310 | 4/2004 |
| GB | 1431012 | 4/1976 |
| GB | 2304851 | 3/1997 |

\* cited by examiner

US 8,506,226 B2

SECURITY SCREW

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates to a security screw.

Specifically the object of this invention is a screw of a threaded cylinder type, generally metallic or thermoplastic, but also possibly of any other convenient material and for any type of thread, metric, and gas that fits a nut with an identical thread. The screw is provided with an opposite direction which presents the special feature to be divided in two parts in a way that makes a normal thread of the nut possible but avoiding its conventional unscrewing. The present invention is an innovative security screw, that in spite of vibrations by using it, the nut will never come loose unless a specific force is used for this aim.

The security screw can be applied for any type of conventional use of any screw, as detailed with the specific peculiarities for each case, being especially useful in applications where unscrewing the nut is common in machine assembly and disassembly.

2. Description of Related Art Including Information Disclosed Under 37 CFR 1.97 and 37 CFR 1.98.

One of the most important problems in structures or elements fixed with screws, is the progressive loosening of the nuts which are threaded to the screws forming the fixing, due to vibrations by its use. This is the reason why they have to be checked and tightened periodically in order to avoid a fatal collapse of the structure where applied.

Naturally, this problem means an important failure in the structures with added expenses as far as time and labor are concerned due to a constant need to tighten the nuts.

However in certain cases such as dental implants, the tightening of the screws can provoke an undesirable damage in the base where the screw is fixed. In this case the bone of the jaw, being a problem which has been difficult to solve until now in the assembly and disassembly of the dental part.

Therefore it was necessary to create a fixing system to solve these problems in a fast and simple way, being this the main aim of this invention, that can be applied in a favorable way on any technical field with use of screws. Although several types of security screws are known in the technique by the applicant, there is no other existing security screw that presents the same or similar technical, structural or constituent features as this one described here.

BRIEF SUMMARY OF THE INVENTION

The security screw that the invention proposes is an innovation in the field of its application, since a fixing system is obtained that makes a conventional threading possible and avoids an accidental or progressive unscrewing caused by vibrations, due to the fact that an unscrewing is not possible unless a certain pressure is applied on one of the parts that divide the new screw.

In a specific way the screw which the invention proposes is formed by a threaded cylinder part that fits a nut with an identical thread (screw tap-nut). It is possible to present any type of dimension and way of threading with any head configuration (hexagonal, Allen® type and so on) or without where the nut also can be of any type and configuration. The screw includes a threaded cylinder screw divided in two parts, the division being carried out in the center of its axial axle or with parallel cuts in the axle to maximum radius. Additionally, in one of these parts a part of material in this threaded way has been partly removed, in such a way that the removed cylinder area covers minimum a 2 degree angle, and 360 degrees corresponding to the complete circulate perimeter. A 178 degree arc is the maximum, making a slightly bigger or smaller radius possible in the circulate crown which conforms to the transverse area of the removed part, as the cylinder part where the cut has been carried out.

In the same way it is possible to make cuts with triangular, polyhedron or other forms (which we will call "triangular pieces of cheese"), which means dividing or cutting the screw in two parts. One of the parts is noticeably smaller than the other one, and in all angles following these criterion: leaving small empty spaces of removed material in both sides, one external and the other one internal, with identical angles making a turn of the smaller part possible for the unscrewing.

In this way, when assembling both parts (which we will call head and point for a better understanding of the explanation) an empty space in the threaded area between these parts is obtained, which depending on the direction the nut is moved, will gather or separate these parts bringing out the screwing and preventing the unscrewing unless the point is being pressed (manually or with any convenient tool). This empty space has been made in the opposite direction of the thread, and in this way makes it possible to unscrew the screw in a normal way and screw it only by pressing the head.

It is important to point out that the described screw admits infinite possibilities of variations, since the division of both parts can be carried out in different ways, when fulfilling mentioned conditions, making in case of interest an axially division in the screw head, the whole point or only in a part of the threaded area, keeping the point and also the screw head intact and in two nearly identical parts (one complete and the other one partly removed) or one part bigger than the other part.

It is also possible to cut the whole screw in an axial way, taking into account that if the force for screwing or unscrewing has to be axial for the partial cuts, in the case of whole cuts the applied force has to be radial.

In any case, it will be necessary that the part be pressed for the unscrewing (or screwing) has to be accessible, adapting each one to the different type of screw and application, and taking into account the weakening of each part when the screw is divided, according to the material used and the force to be supported.

Finally it is important to point out that a nick above the head can be incorporated in the new screw in order to place a tool, screwdriver or spanner making the fixing and threading easier. However, as an option it is also possible that the part to be fixed has a small hole to make the unscrewing easier by putting a convenient tool or point inside to fix this part. Consequently, the new security screw represents an innovative element with structural and constituent features unknown until now for this purpose, reasons that together with its practical usefulness should be enough to obtain the requested privilege of exclusivity.

BRIEF DESCRIPTION OF THE SEVERAL VIEWS OF THE DRAWINGS

To complement this description, and with the aim to obtain a better comprehension of the features of this invention, a set of plans is attached, where the following is represented in an illustrative and unlimited way.

DETAILED DESCRIPTION OF THE INVENTION

According to the figures and the numbers, an example of the preferential execution of the security screw which is detailed as follows.

Figure 1:
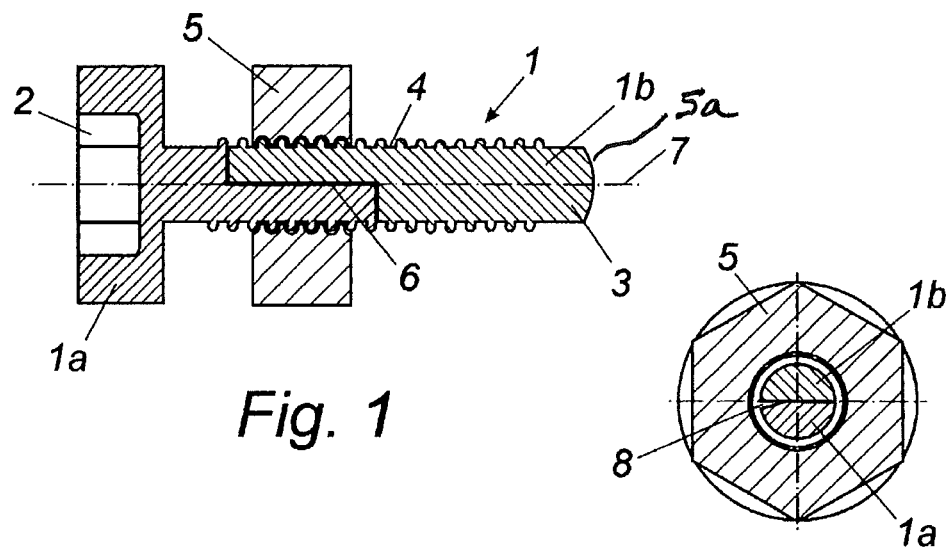
FIG. 1 shows a cross-sectional view of an example of the new security screw according to the invention where the main parts, elements and configuration as well are shown.
Figure 2:
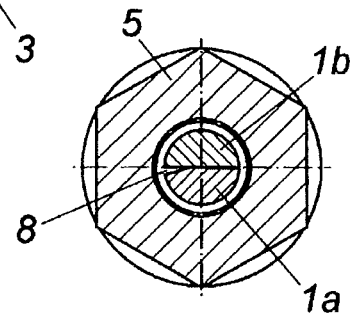
FIG. 2 shows a top view of the example shown on FIG. 1, in this case specially the division and the removed material part from the screw is shown.

As shown on FIG. 1, the screw (1) and the head (2) can be of any configuration (the type Allen is shown in the example), and is formed by a cylinder part (3) with a threaded area (4) where a nut (5) can be connected and a curved end surface 5a. The screw (1) is divided in two parts, a front part or belonging to the head (1b) and a back part belonging to the point (1b) by a dividing line or cut (6) which goes from its axle (7) or in a parallel way to the maximum radius, at least partly in this threaded area (4). As shown on FIG. 2, a part of material has been removed in one of these parts (1a) or (1b), which leaves an empty space (8).

Figure 3:
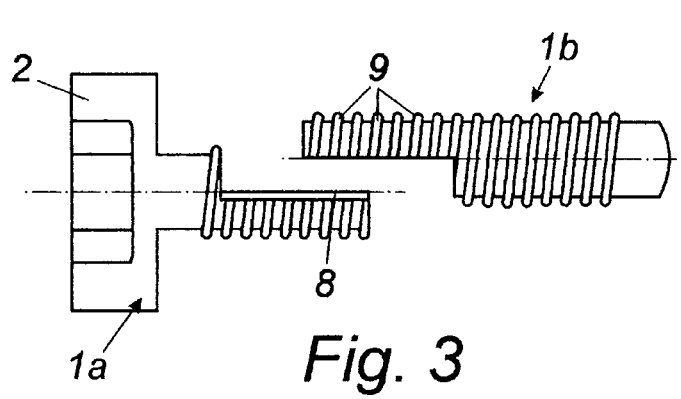
FIG. 3 shows a schematic view of both parts in which the security screw shown in the previous figures is divided.

On FIG. 3 the configuration of both parts of the divided screw (1) is clearly visible, and the empty space (8) as well, or the removed cylinder area, specially of the head (1a), that could have been the point part (1b) too.

It is important to highlight that this empty space (8) of the cylinder part should have an angle of a minimum of 2 degrees of 360 degrees according to the circular perimeter of the total cylinder part (3) and an arch of maximum 178 degrees where this cylinder area which makes the empty space (8) should have a slightly bigger radius or slightly smaller one than the one of the cylinder part (3).

Figures 4, 5:
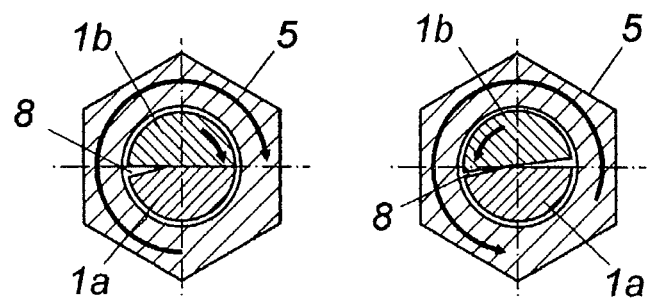
FIG. 4 shows a schematic view of the cylinder threaded part of the new screw, where the relative movement of the back part or the point, when the nut is threaded and its correct position, is indicated by arrows.
FIG. 5 shows a schematic view identical to FIG. 4 wherein the relative movement of the back part or the point, when the nut is unscrewed, opened and disturbed avoiding the unscrewing or threading as suited is indicated by arrows.

This empty space (8), as shown on FIG. 4, makes that the part (1b) of point of the head turns to this side by making the movement of the threaded nut (5) on the threaded area (4) divided by the line (6) in the clockwise direction resulting in a correct position of both parts (1a) and (1b) that makes a correct threading of the nut (5) possible.

Figure 6:
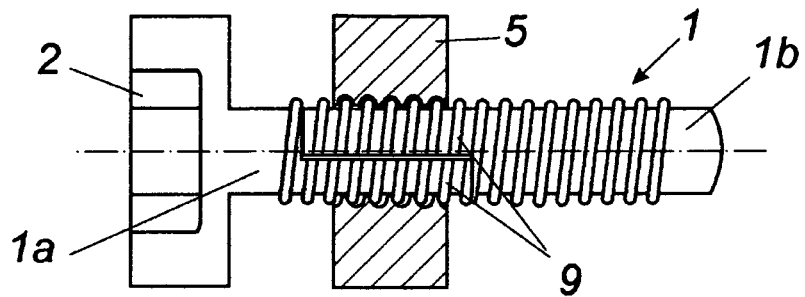
FIG. 6 shows a schematic view of the gap produced inside the thread by unscrewing the nut due to the empty space made between both parts of the cylinder part of the screw.

However, as shown on FIG. 5, by making the opposite movement, unscrewing the nut (5) moving in the opposite direction of the clock, the point part (1b) will then move to this side which due to the empty space of the cylinder (8) will move in a radial way. As shown on FIG. 6, this movement provokes a gap of coincidence of the threads (9) with the ones of the front part or of the head (1a), and the consequent hold of the nut (5), making the unscrewing impossible.

To make an unscrewing possible it will be necessary to make a slight pressure on the point (1b), manually or with a convenient tool depending on each case, in order to avoid that by making the movement of the unscrewing with the nut (5) a turn of this part (1b) will be produced, which results in a normal unscrewing of the nut (5), where a slightly pressure of the point (1b) will be necessary for unscrewing.

Figures 7, 8, 9:
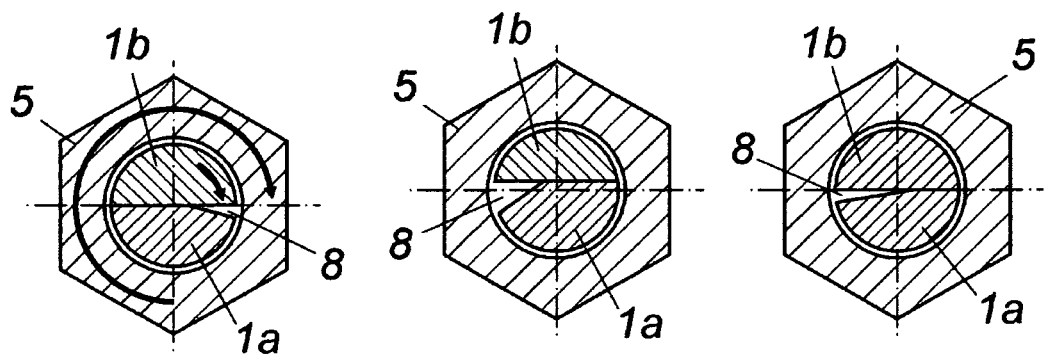
FIG. 7 shows a top view of an alternative embodiment of the present invention wherein the case with the empty space is made in the opposite direction of the thread.
FIG. 8 shows a top view of an alternative embodiment of the present invention wherein the division made in a parallel way to the axle.
FIG. 9 shows a top view of an alternative embodiment of the present invention wherein a bigger radius of the empty space as the one of the cylinder part is shown.

It is important to point out that as shown on FIG. 7, in case the empty space of the cylinder part (8) is made in the opposite direction, a conventional unscrewing will be obtained, and the threading can only then be made holding the part (1b) of the head of the screw (1).

Figure 15:
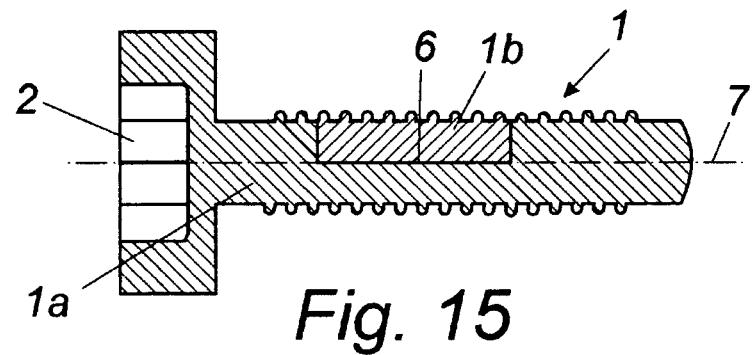
FIG. 15 shows a schematic view of an alternative embodiment of the present invention.

It is also important to mention that the described screw (1) allows many variations, some of them shown on the FIGS. 8 to 15, since the division of both parts (1a) and (1b) can be made in different ways, when all conditions are fulfilled, so in case of interest a transversal division of the screw head (FIG. 12) can be made, of the whole point (FIG. 13), or of the whole screw (FIG. 14), taking into account that for partial cuts the force for threading or unscrewing has to be axial and in total cuts the force has to be radial (FIG. 15).

Figures 10, 11:
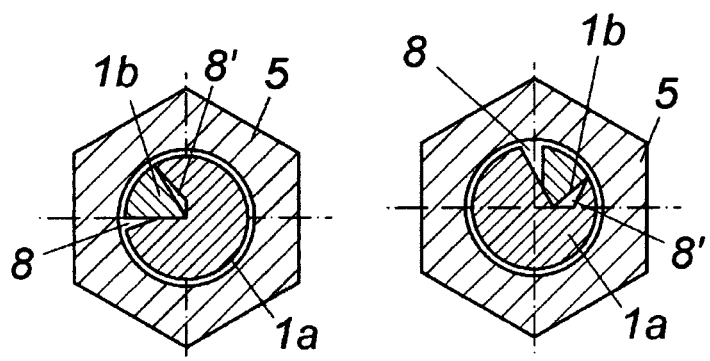
FIG. 10 shows a top view of an alternative embodiment of the present invention wherein one of the parts of the cylinder part of the screw is noticeably smaller than the other one and cut as cylinder area
FIG. 11 shows a top view of an alternative embodiment of the present invention cut as polygonal element with two removed spaces or empty spaces in both sides, one external and the other one internal.
Figure 12:
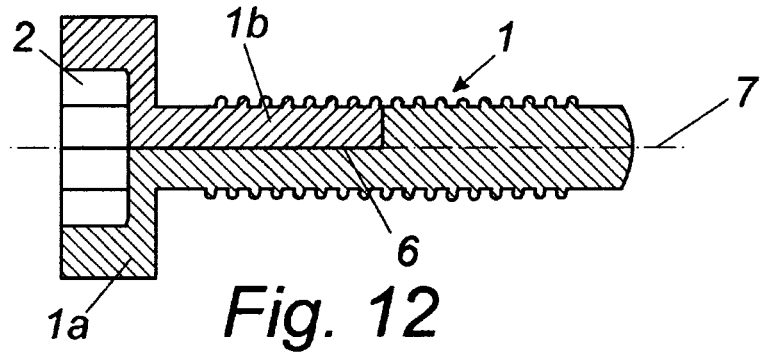
FIG. 12 shows a schematic view of an alternative embodiment of the present invention.
Figure 13:
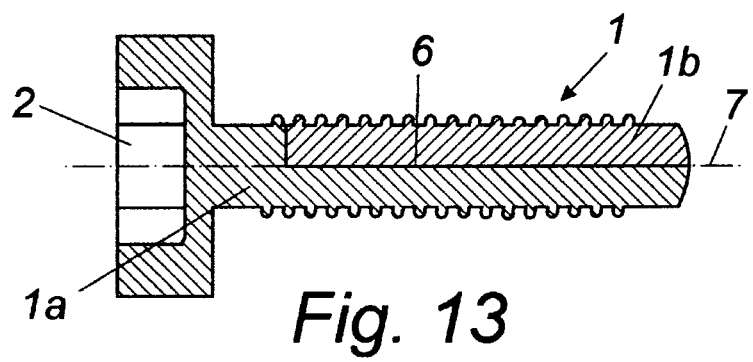
FIG. 13 shows a schematic view of an alternative embodiment of the present invention.
Figure 14:
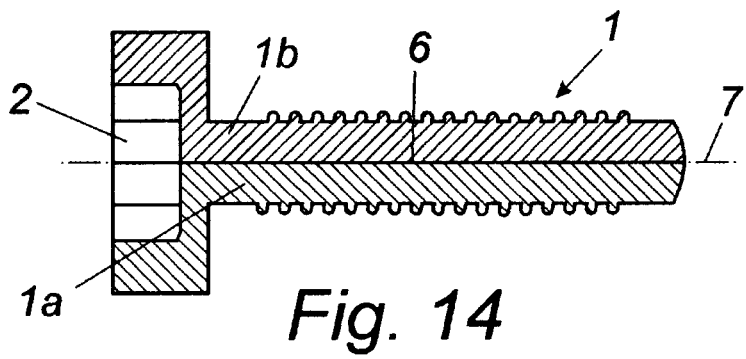
FIG. 14 shows a schematic view of an alternative embodiment of the present invention.

In a radial way the screw (1) can be divided en two identical parts (FIGS. 1 to 9) or one bigger as the other one (FIGS. 10 and 11). In this case the cuts can be made with triangular forms, polyhedron or other forms dividing the screw (1) in two parts, one bigger than the other one fulfilling the condition that in both sides, one external and one internal, empty spaces of removed material are made and that the angles of these empty spaces (8) and (8') are identical making the movement of the part (1b) possible to block the screw.

After a complete description of this invention and an explanation of its use, we consider that it should not be necessary to extend this description since any expert on this field will understand the advantages, pointing out that the same protection is obtained with other different ways of executions as the described examples.

We claim:

1. A security screw apparatus comprising:
a nut having an internal thread, said nut having a length dimension; and
a screw having a head at one end and curved end surface at an opposite end, said screw having a generally cylindrical shank extending between said head and said curved end surface, said shank having an external thread thereon, said shank being formed of a first part and a second part, said first part being connected to said head, said second part being connected to said curved end surface, said first part and said second part being mated together along a division line, said division line having a length dimension greater than said length dimension of said nut, at least one of said first and second parts having a pie-cut along said division line, said pie-cut extending so as to widen at said external thread of said shank so as to define a space between an outer edge of said first part and an outer edge of said second part, said first part being connected to a first portion of said head and connected to a first portion of said curved end surface, said second part being connected to a second portion of said head and connected to a second portion of said curved end surface.

2. The security screw apparatus of claim 1, one of said first and second parts having a radius greater than a radius of the other of said first and second parts.

* * * * *